United States Patent [19]

Wei et al.

[11] Patent Number: 6,152,970
[45] Date of Patent: Nov. 28, 2000

[54] DRYING AN ULTRACAPACITOR

[75] Inventors: Chang Wei, Niskayuna; Elihu Calvin Jerabek, Glenmont; James Day, Scotia, all of N.Y.

[73] Assignee: General Electric Company, Schenectady, N.Y.

[21] Appl. No.: 09/162,529

[22] Filed: Sep. 29, 1998

[51] Int. Cl.[7] .................................................. H01G 9/00
[52] U.S. Cl. ........................ 29/25.03; 361/502; 361/518
[58] Field of Search ........................ 29/25.03; 361/502, 361/503, 512, 518

[56] References Cited

U.S. PATENT DOCUMENTS

| | | | |
|---|---|---|---|
| 4,257,856 | 3/1981 | Beni et al. | 361/502 |
| 4,737,889 | 4/1988 | Nishino et al. | 361/433 |
| 4,803,597 | 2/1989 | Watanabe et al. | 205/638 |
| 5,136,472 | 8/1992 | Tsuchiya et al. | 361/502 |
| 5,150,283 | 9/1992 | Yoshida et al. | 361/502 |
| 5,420,747 | 5/1995 | Ivanov et al. | 361/502 |
| 5,464,453 | 11/1995 | Tong et al. | 29/25.03 |
| 5,589,052 | 12/1996 | Shimamune et al. | 205/349 |
| 5,680,292 | 10/1997 | Thompson, Jr. et al. | 361/528 |
| 5,726,856 | 3/1998 | King, Jr. et al. | 361/502 |
| 5,888,673 | 3/1999 | Kawasato et al. | 429/329 |

FOREIGN PATENT DOCUMENTS 11486  4/1996  WIPO .

OTHER PUBLICATIONS

"Mobility and Ionic Association of Lithium Salts in a Propylene Carbonate–Ethyl Methyl Carbonate Mixed Solvent", Ue & Mori, Electrochem. Soc., vol. 142, No. 8, Aug. 1995.

*Primary Examiner*—John F. Niebling
*Assistant Examiner*—Ha Tran Nguyen
*Attorney, Agent, or Firm*—Noreen C. Johnson; Douglas E. Stoner

[57] ABSTRACT

A multilayer cell is provided that comprises two solid, nonporous current collectors, two porous electrodes separating the current collectors, a porous separator between the electrodes and an electrolyte occupying pores in the electrodes and separator. The mutilayer cell is electrolyzed to disassociate water within the cell to oxygen gas and hydrogen gas. A vacuum is applied to the cell substantially at the same time as the electrolyzing step, to remove the oxygen gas and hydrogen gas. The cell is then sealed to form a ultracapacitor substantially free from water.

21 Claims, 4 Drawing Sheets

150
DRYING AN ULTRACAPACITOR

This invention was made with government support under Contract No. 38-83CH10093 awarded by DOE. The government may have certain rights in the invention.

BACKGROUND OF THE INVENTION

Capacitors are storage devices that store electrical energy on an electrode surface. Electrochemical cells create an electrical charge at electrodes by chemical reaction. The ability to store or create electrical charge is a function of electrode surface area in both applications. Ultracapacitors, sometimes referred to as double layer capacitors, are a third type of storage device. An ultracapacitor creates and stores energy by microscopic charge separation at an electrical chemical interface between electrode and electrolyte.

Ultracapacitors are able to store more energy per weight than traditional capacitors and they typically deliver the energy at a higher power rating than many rechargeable batteries. Ultracapacitors comprise two porous electrodes that are isolated from electrical contact by a porous separator. The separator and the electrodes are impregnated with an electrolytic solution, which allows ionic current to flow between the electrodes while preventing electronic current from discharging the cell. Each electrode is in intimate contact with a current collector. One purpose of the current collector is to reduce ohmic loss. If the current collectors are nonporous, they can also be used as part of the capacitor case and seal.

When electric potential is applied to an ultracapacitor cell, ionic current flows due to the attraction of anions to the positive electrode and cations to the negative electrode. Upon reaching the electrode surface, the ionic charge accumulates to create a layer at the solid liquid interface region. This is accomplished by absorption of the charge species themselves and by realignment of dipoles of the solvent molecule. The absorbed charge is held in this region by opposite charges in the solid electrode to generate an electrode potential. This potential increases in a generally linear fashion with the quantity of charge species or ions stored on the electrode surfaces. During discharge, the electrode potential or voltage that exists across the ultracapacitor electrodes causes ionic current to flow as anions are discharged from the surface of the positive electrode and cations are discharged from the surface of the negative electrode while an electronic current flows through an external circuit between electrode current collectors.

In summary, the ultracapacitor stores energy by separation of positive and negative charges at the interface between electrode and electrolyte. An electrical double layer at this location consists of sorbed ions on the electrode as well as solvated ions. Proximity between the electrodes and solvated ions is limited by a separation sheath to create positive and negative charges separated by a distance which produces a true capacitance in the electrical sense.

During use, an ultracapacitor cell is discharged by connecting the electrical connectors to an electrical device such as a portable radio, an electric motor, light emitting diode or other electrical device. The ultracapacitor is not a primary cell but can be recharged. The process of charging and discharging may be repeated over and over. For example, after discharging an ultracapacitor by powering an electrical device, the ultracapacitor can be recharged by supplying potential to the connectors.

The physical processes involved in energy storage in an ultracapacitor are distinctly different from the electrochemical oxidation/reduction processes responsible for charge storage in batteries. Further unlike parallel plate capacitors, ultracapacitors store charge at an atomic level between electrode and electrolyte. The double layer charge storage mechanism of an ultracapacitor is highly efficient and can produce high specific capacitance, up to several hundred Farads per cubic centimeter.

The presence of water in a nonaqueous ultracapacitor has a detrimental effect on device performance. The water limits both service life and energy density. Water causes corrosion of current collectors and limits service life. The electrochemical decomposition of water occurs at a voltage well below organic electrolyte breakdown. Hence, the presence of water limits operating voltage of a nonaqueous ultracapacitor. Limiting the operating voltage greatly affects stored energy since it increases as the square of voltage to which charge is taken. Finally, electrochemical decomposition of water into oxygen and hydrogen results in a gas accumulation within ultracapacitor devices. Accumulation of gases may breach the ultracapacitor enclosure to cause electrolyte leakage and may displace electrolyte from pores in the electrode and separator to increase resistance.

Water in a nonaqueous ultracapacitor can be reduced by a number of methods. The first method is to pre dry all materials—electrolyte, separator and activated carbon, etc. Once the materials are dry, they are assembled and sealed in a water-free environment. However this procedure is expensive and rarely achieves complete water removal.

It is known that water electrochemically decomposes into oxygen and hydrogen at a voltage much lower than the operating voltage of a nonaqueous ultracapacitor. The present invention is directed to an electrochemical process to decompose water in nonaqueous ultracapacitors into oxygen and hydrogen and then to remove the oxygen and hydrogen under vacuum, The process is inexpensive and effective in removing water from the structure.

SUMMARY OF THE INVENTION

The invention relates to a method of making an ultracapacitor. In the method, an ultracapacitor cell is electrolyzed prior to sealing the cell to form the ultracapacitor.

In another aspect of the invention, a multilayer cell is provided that comprises two solid, nonporous current collectors, two porous electrodes separating the current collectors, a porous separator between the electrodes and an electrolyte occupying pores in the electrodes and separator. The mutilayer cell is electrolyzed to disassociate water within the cell to oxygen gas and hydrogen gas. A vacuum is applied to the cell substantially at the same time as the electrolyzing step, to remove the oxygen gas and hydrogen gas. The cell is then sealed to form a ultracapacitor substantially free from water.

In another aspect, the invention relates to a method of making a stacked ultracapacitor. In the method, a stack of multilayer cells is provided wherein each cell comprises two solid, nonporous current collectors, two porous electrodes separating the current collectors, a porous separator between the electrodes and an electrolyte occupying pores in the electrodes and separator. The stack is electrolyzed to disassociate water within the cell to oxygen gas and hydrogen gas. A vacuum is applied to the stack substantially at the same time as the electrolyzing step, to remove the oxygen gas and hydrogen gas. The stack is then sealed to form a stacked ultracapacitor substantially free from water.

DETAILED DESCRIPTION OF THE INVENTION

Figure 1:
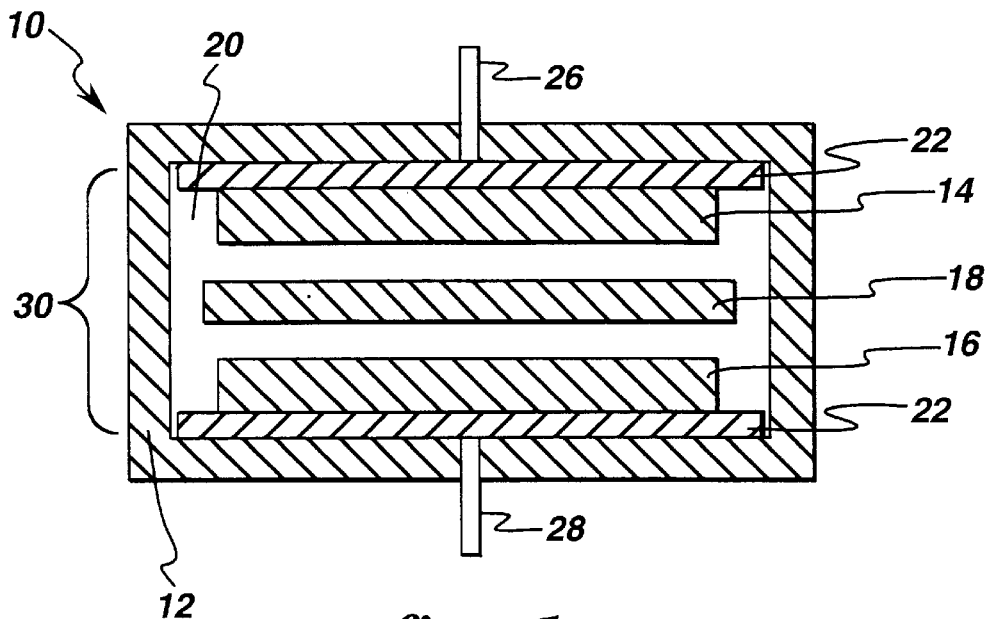
FIG. 1 is a front sectional view of an ultracapacitor.
Figure 2:
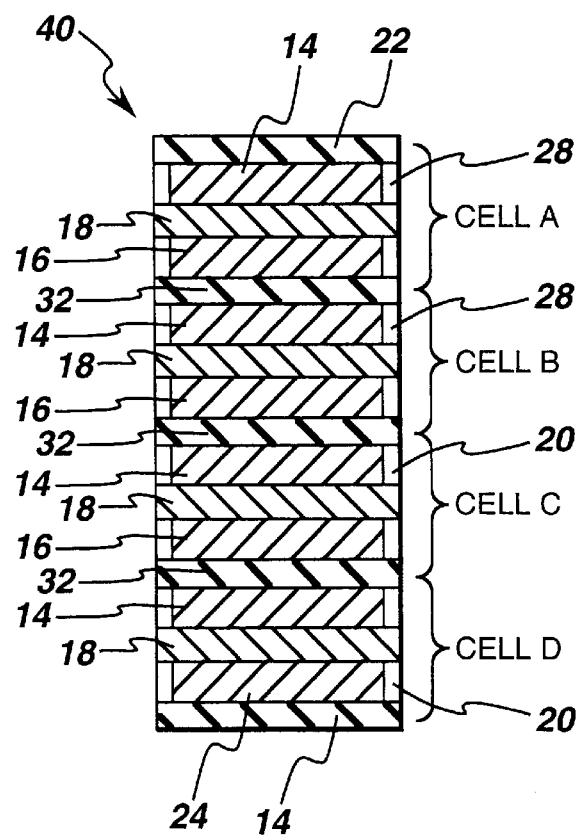
FIG. 2 is a front sectional view of a series stack of ultracapacitor cells.

The method of the invention may be used to make and to dry a wide variety of ultracapacitors such as described in U.S. Pat. Nos. 5,464,453; 5,420,747; 5,150,283; 5,136,472; and 4,803,597; as well as PCT Application WO96/11486 (PCT/US95/12772; Apr. 18, 1996), all of which are incorporated herein by reference. FIGS. 1 and 2 herein, are based on PCT Application WO96/11486 and show a nonlimiting example of an ultracapacitor and a stacked ultracapacitor made by the method of the present invention.

In all of the Figures of this application, like structures are identified by the same numbers.

Referring to FIG. 1, ultracapacitor 10 includes a nonconductive enclosing body 12, a pair of carbon electrodes 14 and 16, an electronic porous separator layer 18, an electrolyte 20, a pair of conductive layers which are current collectors 22 and 24 and electrical leads 26 and 28, extending from the current collectors 22 and 24. One of the pair of current collectors 22 and 24 is attached to the back of each electrode 14 and 16. In FIG. 1, electrodes 14 and 16 can each represent a plurality of electrodes so long as the electrodes are porous to electrolyte flow.

The current collectors 22, 24 commonly are made of aluminum because of its conductivity and cost. In the drawings, the current collectors 22 and 24 are thin layers of aluminum foil. However, the electrodes can be any suitable conductive material.

The electronic separator 18 is preferably made from a highly porous material which acts as an electronic insulator between the carbon electrodes 14 and 16. The separator 18 assures that opposing electrodes 14 and 16 are never in contact with one another. Contact between electrodes can result in a short circuit and rapid depletion of the charges stored in the electrodes. The porous nature of the separator 18 allows movement of ions in the electrolyte 20. A wide variety of types and arrangements of separation layers can be employed, as those of ordinary skill in the electrochemical arts realize. Separation layers are usually made from nonconductive materials such as cellulosic materials; glass fiber; polymers such as polyesters or polyolefins; and the like. In those embodiments in which the separator layers will be in contact with sealant material, they should have a porosity sufficient to permit the passage of sealant and should be resistant to the chemical components in the sealant. In a typical ultracapacitor, the separator layers have a thickness in the range of about 0.5 mil to about 10 mils. Preferred separators 18 are porous polypropylene and tissue cellulosic materials. Exemplary organic solvents for electrolyte 20 include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. Preferably, the electrolyte 20 includes a polar aprotic organic solvent such as a cyclic ester, chain carbonate, cyclic carbonate, chain ether and/or cyclic ether solvent and a salt. Preferred cyclic esters are esters having 3 to 8 carbon atoms. Examples of the cyclic esters include β-butyrolactone, γ-butyrolactone, γ-valerolactone and δ-valerolactone. The chain carbonates are preferred to be carbonates having 3 to 8 carbon atoms. Examples of the chain carbonates include dimethyl carbonate, diethyl carbonate, dipropyl carbonate, methyl ethyl carbonate, methyl propyl carbonate and ethyl propyl carbonate. The preferred cyclic carbonates have 5 to 8 carbon atoms. Examples of the cyclic carbonates include 1,2-butylene carbonate, 2,3-butylene carbonate, 1,2-pentene carbonate, 2,3-pentene carbonate and propylene carbonate. The preferred chain ethers have 4 to 8 carbon atoms. Examples of the chain ethers include dimethoxyethane, diethoxyethane, methoxyethoxyethane, dibutoxyethane, dimethoxypropane, diethoxypropane and methoxyethoxypropnane. The preferred cyclic ethers have 3 to 8 carbon atoms. Examples of the cyclic ethers include tetrahydofuran, 2-methyl-tetrahydrofuran, 1,3-dioxolan, 1,2-dioxolan, 2-methyldioxolan and 4-methyl-dioxolan.

Suitable electrolyte salts include quaternary ammonium salts such as tetraethylammonium tetraflouroborate (($Et)_4$ $NBF_4$), hexasubstituted guanidinium salts such as disclosed in U.S. Pat. No. 5,726,856, the disclosure of which is incorporated herein by reference, and lithium salts such as disclosed by Ue et al., Mobility and Ionic Association of Lithium Salts in a Propylene Carbonate-Ethyl Carbonate Mixed Solvent, *Electrochem. Soc.*, vol. 142, No. 8, August 1995, the disclosure of which is incorporated herein by reference.

In a preferred embodiment, the electrodes 14, 16 in FIG. 1, are both carbon electrodes on aluminum current collectors. The electrode can be fabricated by a forming process or by pressing electrode materials in a die and slurry pasting or screen printing carbon as a paste with a liquid phase binder/fluidizer. The liquid phase may be water or an electrolyte solvent with or without a thinner such as acetone. Both dry and wet electrode formations may include a binder such as polymers, starches, Teflon® particles or Teflon® dispersions in water.

The enclosing body 12 can be any known enclosure means commonly used with ultracapacitors. It is an advantage to minimize the weight of the packaging means to maximize the energy density of the ultracapacitor. Packaged ultracapacitors are typically expected to weigh 1.25 to 2 times more than the unpackaged ultracapacitor. The electrical leads 26 and 28 extend from the current collectors 22 and 24 through the enclosing body 12 and are adapted for connection with an electrical circuit (not shown).

Ultracapacitor 10 of FIG. 1 includes a bipolar double layer cell 30 that includes two solid, nonporous current collectors 22, 24, two porous electrodes 14, 16 separating the current collectors 22, 24 and a porous separator 18 between the electrodes 14, 16 and an electrolyte 20 occupying pores in the electrodes 14, 16 and separator 18. Individual ultracapacitor cells can be stacked in series to increase operating voltage. The optimum design is to have adjacent cells separated with only a single current collector. This collector is nonporous so that no electrolytic solution is shared between cells. This type of design is called bipolar and is illustrated in FIG. 2 of the drawings. In a bipolar double layer capacitor, one side of the current collector contacts a positive electrode and the other side contacts a negative electrode of an adjacent cell.

A series stack 40 of the high performance bipolar double layer cells 30 (A, B, C and D) is illustrated in FIG. 2. In FIG.

2, each pair of polarized carbon electrodes, 14, 16 is separated with a separator 18. A current collector 32 is attached at one surface to charged electrode 14 of a first cell. Attached to an opposite surface of the current collector 32, is an oppositely charged electrode 16 of a second cell. If one side of the current collector 32 is in contact with the negative electrode for a first capacitor cell "A," then the other side of the same current collector 32 is in contact with a positive electrode for an adjacent cell "B." A sufficient amount of an electrolyte 20 is introduced such that the electrolyte 20 saturates the electrodes 14 and 16 and separator 18 within each cell. Exterior current collectors 22 and 24 are placed at each end of the stack.

The internal current collectors 32 of the series stack of cells are preferably nonporous layers of aluminum foil designed to separate the electrolyte 20 between adjacent cells. The exterior current collectors are also nonporous such that they can be used as part of the external capacitor case seal, if necessary. The electronic separator 18 is located between the opposing carbon electrodes 14 and 16 within a particular capacitor cell. The electronic separator 18 allows ionic conduction via charged ions in the electrolyte.

The ultracapacitor cell can be constructed by placing the layers of conductor, electrode and separator along with electrolyte within an enclosing body. The structure can then be subjected to pressure to seal the layers within the enclosing body. Alternatively, the enclosing body can be subjected to pressure and vacuum. The vacuum acts to remove gases while the ultracapacitor is sealed. Alternatively, the ultracapacitor cell can be constructed by providing adhesive between layers and applying pressure and or heat throughout the adhesive to seal the cell.

Figure 3:
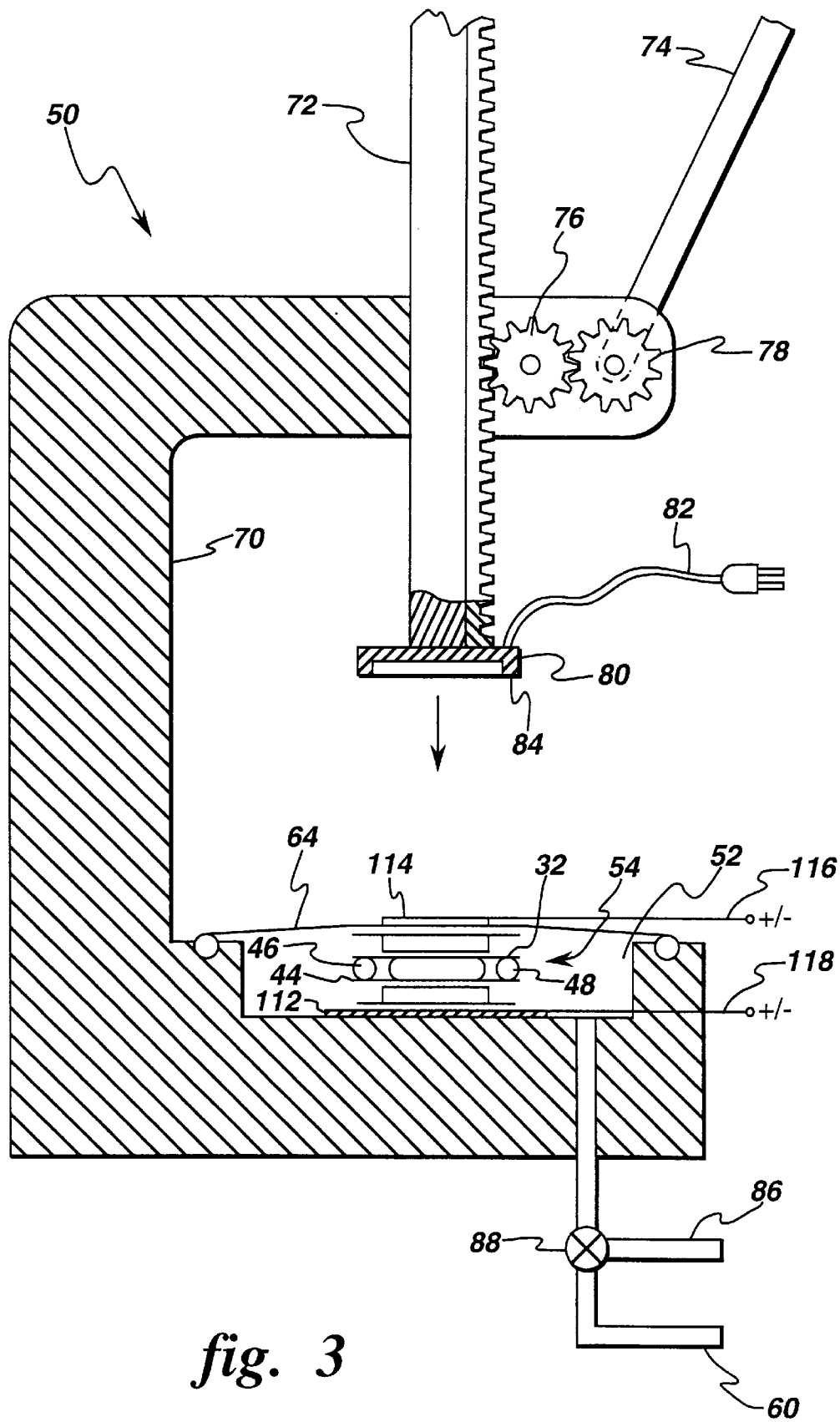
FIG. 3 is a cross-sectional view of an exemplary apparatus for sealing an ultracapacitor.

FIG. 3 depicts one, non-limiting illustration of an apparatus and method of making an ultracapacitor or series stack of ultracapacitor cells according to the present invention. Referring to FIG. 3, structure 50 is a frame, platform, or other construction but is often a press as described below. An enclosable region is depicted in FIG. 3 as recess 52, in which an ultracapacitor series stack 40 is disposed onto a first drying electrode 112. The embodiment illustrated in FIG. 3 permits application of an electrical charge to energize the ultracapacitor or stack for drying. This embodiment also permits the application of vacuum while the ultracapacitor or stack is sealed.

In FIG. 3, primary vacuum tube 60 communicates with recess 52. A collapsible membrane 64 can be fastened over the ultracapacitor to maintain a vacuum while the cell is being sealed by pressing. The membrane is fitted with a second drying electrode 114. The first drying electrode 112 and the second drying electrode 114 are connected by respective leads 116 and 118 to a means for applying an electrical potential.

Figure 4:
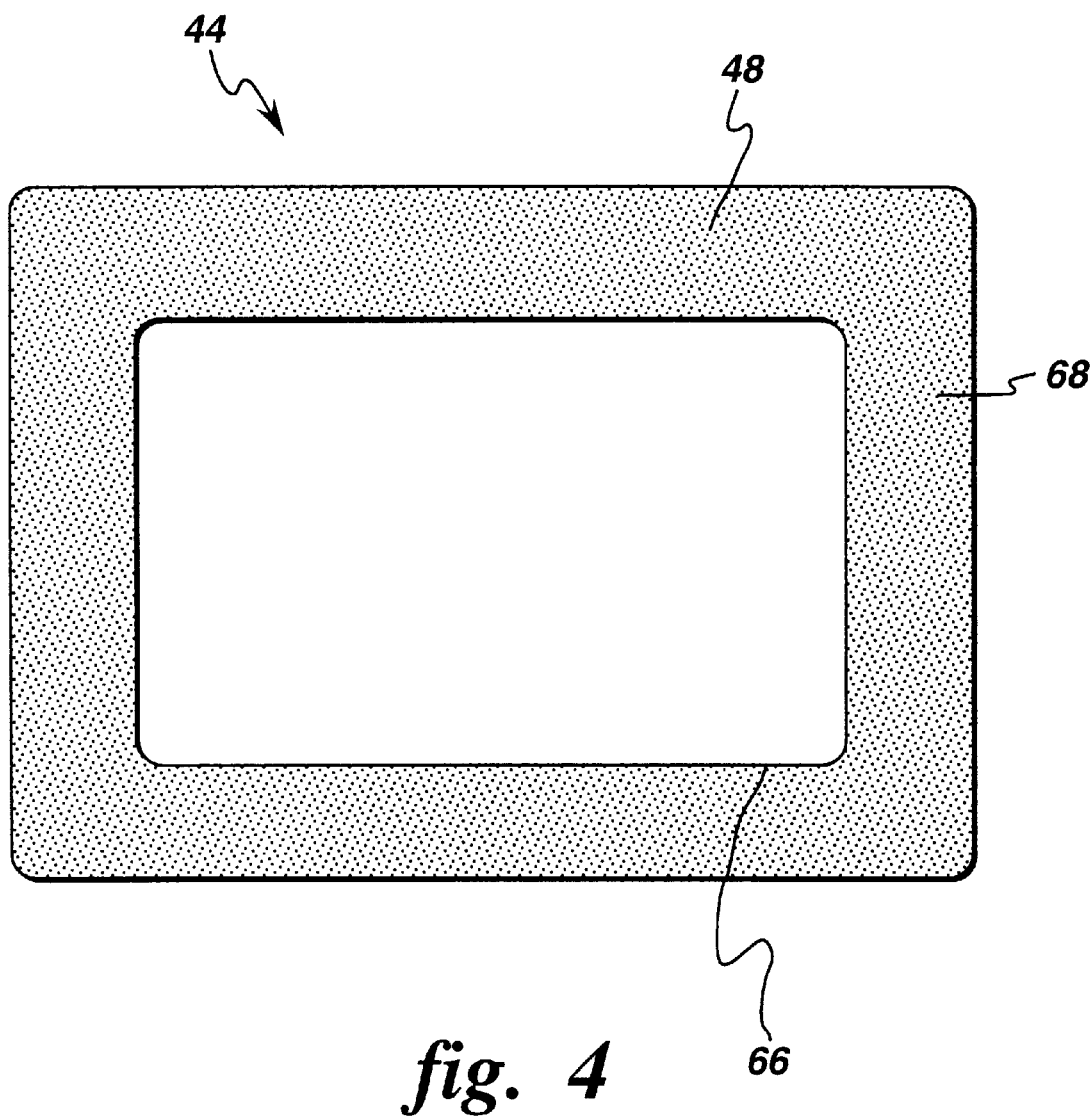
FIG. 4 is a top cross-sectional view of a separator of a sealed ultracapacitor.

FIG. 3 shows an ultracapacitor cell disposed in the recess area of the press 50. The cell includes a separator system, comprising an upper separator layer 42 and a lower separator layer 44. Sealant portions 46 and 48 are disposed in a peripheral area between the bottom surface of separator 42 and the top surface of separator 44. "Peripheral" refers to the boundary area of the separator layers. In general, this area should be as small as possible. This boundary area is designated as element 68 in FIG. 4. FIG. 4 provides a top, cross-sectional view of a separator layer similar to layer 44 of FIG. 3, after sealant has spread to some extent by the action of pressure and, optionally, heat, as described below. The boundary area 68 surrounds the primary section 66 of a separator layer.

Many different types of sealants can be used in the present invention and the term is meant to encompass, "glues", or "pastes." Sealants are described, for example, in the *Kirk-Othmer Encyclopedia of Chemical Technology*, 3rd Edition, Vol.1, pp.488–508 (1978), and in *The Condensed Chemical Dictionary*, 10th Edition, 1981, Van Nostrand Reinhold Company. In general, the selected sealant should be chemically resistant to electrolyte. It should also be capable of withstanding operating temperatures of the ultracapacitor without substantial degradation. Moreover in those embodiments where the sealant contacts the separators, it should be capable of flowing through the thickness of the separator layers. Once cured, the sealant should be substantially impermeable to the flow or passage of electrolyte.

Heat-curable sealants may be used in some embodiments. Moisture-cured sealants or externally-cured materials may be used. Other embodiments may use air-curable or pressure-sensitive sealants, such as "hot melt" glues. Illustrative sealants include those based on acrylic, ethylene such as ethylene vinyl acetate (EVA) copolymer, silicone, rubber, epoxy materials, or combinations of these materials. Commercial examples include the materials commonly referred to as "hot glues."

The sealants are usually in the form of liquids, pastes, or solids. A sealant may be applied to one or both of the facing surfaces of the separators or other surfaces. Many techniques are available for applying sealant. Known application techniques include the use of a spatula, brush, roller, spray, or glue gun. As one example, a bead, strip or "ring" of sealant is applied along the peripheral area 68 of one of the separator layers. Alternatively, individual droplets of sealant can be deposited at sites in the peripheral area 68 with the droplets flowing and covering the peripheral area 68 upon the application of pressure, vacuum and/or heat. As yet another alternative, at least one of the separator layers 18 can be pre-impregnated with sealant. All of these techniques cause the sealant to form a continuous layer. In general, the particular method of deposition is not critical, as long as the sealant is applied to locations where it will eventually form a seal after pressure or vacuum is released. The ultracapacitor becomes sealed by a barrier which is perpendicular to the horizontal capacitor layers which are encased in the barrier.

A compressive force is applied to promote the flow of the sealant-especially in the case of sealant compositions with very high softening points or glass transition temperatures, such as the EVA based types. Compression can be applied indirectly to the sealant through upper ultracapacitor layers by means of the mechanical press 50 of FIG. 3. Other devices to seal an ultracapacitor include an hydraulic press or pneumatic press or any device for applying compressive force. The press 50 of FIG. 3 includes structural frame 70 and adjustable beam 72. The length of beam 72 moves in a direction perpendicular to the base portion of the structural frame as controlled by the selective action of hand lever 74 and gears 76 and 78. Compression element 80 is detachably attached as the base of beam 72. Bottom surface 82 can be similar in shape to the peripheral area of the top planar surface of ultracapacitor 40. The force applied by the press should be sufficient to cause the sealant to become substantially fluid, to flow and form a continuous bead or strip around the peripheral area of the layer on which it is deposited. Thus, the particular press force depends in large part on the nature of the sealant. In general, the pressure will be in the range of about 1 psi to about 1,000 psi and preferably, in the range of about 10 psi to about 100 psi. A lower press force will be suitable for lower viscosity sealants and a higher press force will be required for higher viscosity materials.

The sealant can be heated while being compressed. Heating enhances the flow characteristics of the sealant. Heating temperature should be sufficient to soften the sealant. Preferably, the temperature is high enough to melt the sealant. For a sealant made from an EVA based material, a suitable temperature will be in the range of about 100° C. to about 300° C.

Heat is applied to the sealant in the press 50 of FIG. 3 by means of a standard electrical heating element that is encased within element 80 and is connected to an electrical outlet by way of cord 82. The bottom surface 84 of element 80 has a shape that aligns with sealant-containing peripheral regions of ultracapacitor 10. Thus, when compression element 80 is lowered for compression of the ultracapacitor through membrane 64, heat is transmitted primarily to the sealant containing regions.

A vacuum can be applied to press together the layers of the ultracapacitor and to evacuate ambient gasses from the internal region of the cell structure. In FIG. 3, vacuum tube 60 is connected to a vacuum source through vacuum valve 88 with backfill vacuum tube 86. When vacuum is applied, the collapsible membrane 64 is positioned over recess 52. The membrane 64 maintains the vacuum within the recess and transmits the applied compressive force to the layers of the ultracapacitor. The membrane 64 is heat-resistant to a temperature of about 400° C. The amount of vacuum applied ranges from about 700 mm mercury to 0.1 mm mercury. A typical vacuum pressure is in the range of about 500 mm mercury to about 0.1 mm mercury.

In operation, the applied vacuum pressure draws collapsible membrane 64 tightly against the top of ultracapacitor 10 and causes second drying electrode 116 to contact the ultracapacitor. An electrical potential is applied across the electrodes 114, 116 provided on opposing sides of the ultracapacitor 10. The electrical potential causes disassociation of water entrained within the ultracapacitor to oxygen and hydrogen which is drawn out of the recess area by the applied vacuum. The subsequent action of compression element 80 induces sealant 46, 48 to permeate the peripheral regions of separator layers 18. The sealant contacts substantially aligned peripheral areas 60 of the facing surfaces of conductive layers 22 and 24. As the sealant cures or solidifies, it forms a strong bond to join layers 22 and 24. Alter sealing is complete, compression element 80 is retracted and the ultracapacitor is allowed to cool.

When a constant voltage, for example about 2.0V, is applied to two electrodes of an ultracapacitor, oxidation of water to oxygen and reduction of water to hydrogen takes place at respective electrodes. The applied voltage is not high enough to decompose nonaqueous electrolyte but is sufficient to oxidize/reduce the water. The overall reaction for the decomposition of water can be expressed as follows: $2H_2O = 2H_2 + O_2$ Water is simultaneously consumed at both cathode and anode. Electrolysis of water in an ultracapacitor can be efficient since the electrodes have a relatively large surface area compared to the electrolyte volume.

In the process of the invention, an unsealed or partially sealed ultracapacitor cell is placed in a vacuum chamber. A sealant such as an EVA adhesive, e.g. SEARS HOT GLUE, can be placed between current collectors of the unsealed portion of the cell. The current collectors of the ultracapacitor cell are connected to a DC power source. FIG. 3 illustrates a suitable device for conducting the process of the invention. In FIG. 3, the unsealed or partially sealed ultracapacitor cell 54, is placed into the recess 52 of press 50. The cell 54 is attached to a power source via leads 116 and 118.

Application of a DC voltage electrochemically decomposes water within the cell to oxygen and hydrogen. Generally, the operating voltage is about 1.7V to about 3.0V, preferably about 1.7V to about 2.75 and most preferably about 2.0V to about 2.5V. Electrolysis is effected generally in a period of 2 to 24 hours, preferably 6 to 20 hours and most preferably about 10 to about 18 hours. A fixed voltage can be applied to the cell or the voltage can be cycled and/or applied in sequential steps. Generally, a cycling range will be about +3.0V to about −3.0V, preferably about 2.75V to about −2.75V and most preferably about 2.0–2.5V to about −2.0–2.5V. Sequential application of voltage in steps and cycling voltage can be used to avoid current saturation in some applications where an initial high voltage will cause a violent gas evolution that will destroy the cell.

The electrolysis can be conducted while the cell is under vacuum so as to remove resulting gases. Again FIG. 3 illustrates a device for applying vacuum via vacuum 60 and valve 88 during electrolysis. Generally, an applied vacuum will be about 20 inches Hg to about 28 inches Hg, preferably about 24 inches Hg to about 28 inches Hg and most preferably about 26 inches Hg to about 28 inches Hg. The ultracapacitor cell is sealed immediately upon completion of electrolysis without breaking the vacuum by applying pressure and/or heating the sealant.

It is important that the ultracapacitor not be completely sealed during the electrochemical decomposition procedure so that generated oxygen and hydrogen can be simultaneously removed from the cell. According to the present invention this can be accomplished by partially sealing the cell with sealant, pressure and/or heat prior to subjecting the ultracapacitor cell to electrolysis in the closed container under vacuum. Gases produced by water decomposition from electrolysis are then continuously removed by the vacuum. This procedure can be used in conjunction with a dryroom operation to remove all remaining trace amounts of water from the active materials and electrolytes. The cell is then completely sealed by the application of additional sealant and pressure and heat to provide an ultracapacitor cell free from water.

The following examples are illustrative of the invention.

EXAMPLE 1

In this example, a 5"×5" ultracapacitor cell was constructed using conductive Kapton® (a carbon filled polyimide 90XC275 film from DuPont, Wilmington,. Del.) current collectors, Kimwipes® (a cellulosic tissue from Kimberly-Clark Corporation, Roswell, Ga.) sheet separator and a 1M propylene carbonate/tetraethylammonium tetrafluoroborate solution as electrolyte. Sequential constant voltages of 2.0V, 2.3V and 2.5V were applied to the cell current collectors by a 273A potentiometer (from EG&G Instruments, N.J.) for periods of 884 seconds, 4031 seconds and 54800 seconds respectively. At the same time, the cell is subjected to a vacuum of 27 inches Hg. Current flow through the cell was recorded as a function of time. Residual current dropped from >10 mA after 884 seconds at 2.0V to <5 mA after 54800 seconds at 2.5V as a result of removal of water from the ultracapacitor cell. The cell was then sealed by applying pressure and sealant and heating the sealant.

EXAMPLE 2

A 1.5"×1.5" ultracapacitor cell was fabricated using 2 mil aluminum foil current collectors a Kimwipes® tissue separator and saturated propylene carbonate/tetraethylammonium tetrafluoroborate electrolyte. The current collectors were attached to an EG&G 273A potentiostat and voltage was applied in 2.0V to −2.0V cycles for about 20 hours. The cell was then sealed by applying pressure and sealant and heating the sealant.

The cell was then characterized by cyclic voltammetry. Current through the ultracapacitor was observed while the voltage across the two electrodes was swept from a lower negative limit $(-V_f)$ to a positive upper limit $(+V_f)$ of equal magnitude at a constant voltage sweep rate (S). The voltage sweep rate was then reversed to −S and the voltage swept back to the lower limit $(-V_f)$. The cycles were repeated until observed current waveform was reproducible from one cycle to the next.

Figure 5:
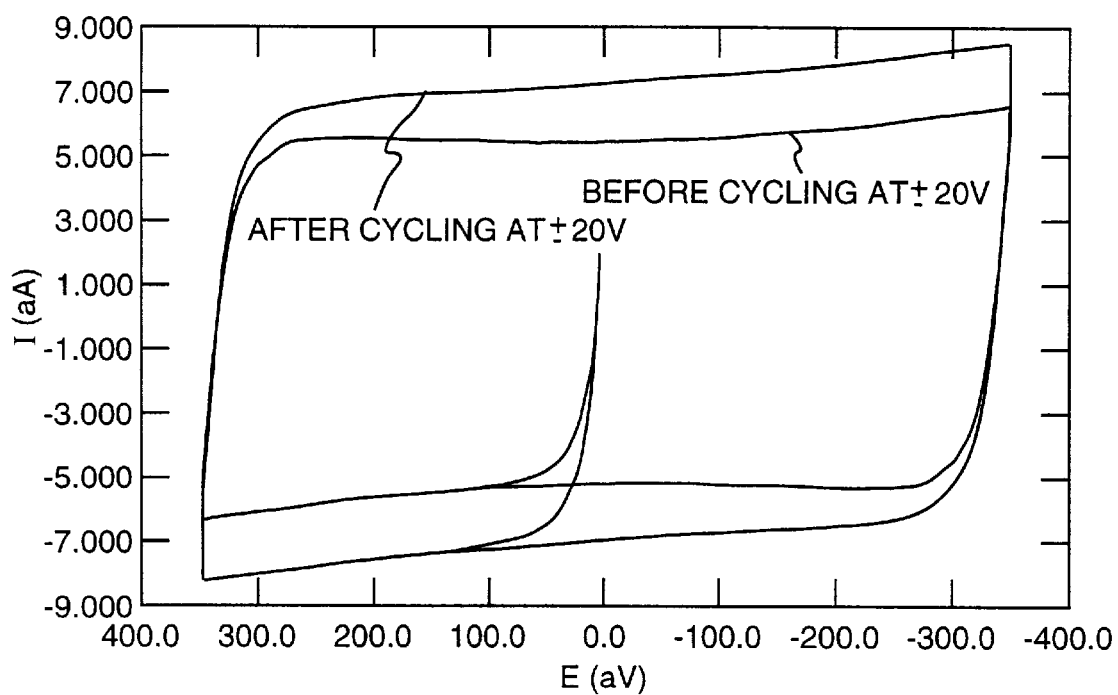
FIG. 5 shows current potential curves.

The observed current waveform was interpreted by modeling the ultracapacitor as a series RC circuit in which a capacitance C is connected in series with a resistance R, assuming negligible leakage. Here R was considered the total resistive contribution from electrolyte and electrode structure. In practice, R is never truly zero in the series RC circuit. Thus current changes at the voltage limits are not instantaneous but occur exponentially in time. If sweeprate is chosen small enough, the current waveform approaches a square wave as shown in FIG. 5. In FIG. 5, the amplitude of steady current between 350 mV and −350 mV represents capacitance value of the ultracapacitor cell. The higher the steady current value, the higher the capacitance. FIG. 5 shows that ultracapacitor capacitance significantly increased after voltage cycling.

This example shows that voltage cycling can increase ultracapacitor capacitance-by ten to twenty percent as shown in FIG. 5.

What is claimed is:

1. A method of making an ultracapacitor comprising eliminating moisture from a non-aqueous ultracapacitor cell by electrolyzing said ultracapacitor cell using voltage cycling, and simultaneously applying a vacuum prior to and sealing said cell to form said ultracapacitor.

2. The method of claim 1, wherein said electrolyzing comprises applying a constant voltage to said cell.

3. The method of claim 1, wherein said electrolyzing comprises applying a voltage to said cell in sequential steps of different or the same voltage.

4. The method of claim 1, wherein said electrolyzing comprises applying a voltage to said cell in cycles between a negative voltage and a positive voltage.

5. The method of claim 4, wherein said electrolyzing comprises applying a voltage in cycles between about 3.0V to about −3.0V to said cell.

6. The method of claim 1, wherein said electrolyzing comprises applying a voltage between about 1.7V and about 3.0V.

7. The method of claim 1, wherein said electrolyzing comprises applying a voltage for about 2 hours to about 24 hours.

8. A method of making an ultracapacitor, comprising;
   (A) providing a multilayer cell comprising in sequence two solid, nonporous current collectors, two porous electrodes separating said current collectors, a porous separator between said electrodes and an electrolyte occupying pores in said electrodes and separator;
   (B) electrolyzing said mutilayer cell to disassociate water within said multilayer cell to oxygen gas and hydrogen gas;
   (C) applying a vacuum to said cell at the same time as said electrolyzing step, to remove said oxygen gas and hydrogen gas; and
   (D) sealing said cell to form said ultracapacitor substantially free from water.

9. The method of claim 8, wherein said electrolyzing comprises applying a constant voltage to said cell.

10. The method of claim 9, wherein said electrolyzing comprises applying a voltage to said cell in sequential steps of different or the same voltage.

11. The method of claim 9, wherein said electrolyzing comprises applying a voltage to said cell in cycles between a negative voltage and a positive voltage.

12. The method of claim 11, wherein said electrolyzing comprises applying a voltage in cycles between about 3.0V to about −3.0V to said cell.

13. The method of claim 9, wherein said electrolyzing comprises applying a voltage between about 1.7V and about 3.0V.

14. The method of claim 9, wherein said electrolyzing comprises applying a voltage for about 2 hours to about 24 hours.

15. A method of making a stacked ultracapacitor, comprising in sequence:
   (A) providing a stack of multilayer cells each comprising two solid, nonporous current collectors, two porous electrodes separating said current collectors, a porous separator between said electrodes and an electrolyte occupying pores in said electrodes and separator
   (B) electrolyzing said stack to disassociate water within said multilayer cell to oxygen gas and hydrogen gas;
   (C) applying a vacuum to said stack substantially at the same time as said electrolyzing step, to remove said oxygen gas and hydrogen gas; and
   (D) sealing said stack to form said stack substantially free from water.

16. The method of claim 15, wherein said electrolyzing comprises applying a constant voltage to said stack.

17. The method of claim 15, wherein said electrolyzing comprises applying a voltage to said cell in sequential steps of different or the same voltage.

18. The method of claim 15, wherein said electrolyzing comprises applying a voltage to said stack in cycles between a negative voltage and a positive voltage.

19. The method of claim 18, wherein said electrolyzing comprises applying a voltage in cycles between about 3.0V to about −3.0V to said cell.

20. The method of claim 15, wherein said electrolyzing comprises applying a voltage between about 1.7V and about 3.0V.

21. The method of claim 15, wherein said electrolyzing comprises applying a voltage for about 2 hours to about 24 hours.

* * * * *